(12) United States Patent
Ishi et al.

(10) Patent No.: US 8,854,464 B2
(45) Date of Patent: Oct. 7, 2014

(54) ACTIVE VISIBILITY SUPPORT APPARATUS AND METHOD FOR VEHICLE

(75) Inventors: Tsutomu Ishi, Minato-ku (JP); Yumiko Yoshikawa, Minato-ku (JP); Ryuji Funayama, Yokohama (JP); Shinya Kawamata, Gotenba (JP)

(73) Assignees: NEC Corporation, Tokyo (JP); Toyota Jidosha Kabushiki Kaisha, Aichi-ken (JP)

( * ) Notice: Subject to any disclaimer, the term of this patent is extended or adjusted under 35 U.S.C. 154(b) by 323 days.

(21) Appl. No.: 13/038,567

(22) Filed: Mar. 2, 2011

(65) Prior Publication Data

US 2011/0216196 A1     Sep. 8, 2011

(30) Foreign Application Priority Data

Mar. 3, 2010   (JP) ................................ 2010-046429

(51) Int. Cl.
*H04N 7/18*   (2006.01)
*G06K 9/00*   (2006.01)
*G06K 9/20*   (2006.01)
*B60R 1/00*   (2006.01)

(52) U.S. Cl.
CPC ............ *H04N 7/18* (2013.01); *B60R 2300/307* (2013.01); *G06T 2207/10048* (2013.01); *G06K 9/00624* (2013.01); *G06T 2207/20144* (2013.01); *B60R 2300/30* (2013.01); *G06K 9/2018* (2013.01); *B60R 1/00* (2013.01)
USPC ....... 348/148; 348/207.99; 348/360; 382/103

(58) Field of Classification Search
None
See application file for complete search history.

(56) References Cited

U.S. PATENT DOCUMENTS

| 6,072,889 | A | * | 6/2000 | Deaett et al. .................. 382/103 |
| 2004/0161159 | A1 | * | 8/2004 | Holz et al. ..................... 382/254 |
| 2005/0099527 | A1 | * | 5/2005 | Fujii ............................. 348/360 |
| 2005/0206907 | A1 | * | 9/2005 | Fujimoto et al. ............. 356/504 |

(Continued)

FOREIGN PATENT DOCUMENTS

| CN | 101263445 A | 9/2008 |
| JP | 11-96333 A | 4/1999 |

(Continued)

OTHER PUBLICATIONS

Japanese Office Action dated Jan. 4, 2012 issued in Japanese Application No. 2010-046429.

(Continued)

*Primary Examiner* — Christopher S Kelley
*Assistant Examiner* — Kaitlin A Retallick
(74) *Attorney, Agent, or Firm* — Sughrue Mion, PLLC

(57) ABSTRACT

A visibility support apparatus includes a light receiving unit receiving reflected light from an object to generate a signal for an image for each of wavelength bands, a wavelength selecting unit to set, in the image for at least one wavelength band, a set of those of pixels with comparable signal intensities which define the largest occupied area to be a reference area and to compare, for each of identification target pixels not included in the reference area, a value of the pixel in the image for each wavelength band with a pixel value of the reference area to select at least two wavelength bands which are effective for detecting the object, and a display unit to group the identification target pixels based on a wavelength band combination selected for each identification target pixel and display an image in which the object is distinguishably shown based on the grouping.

10 Claims, 4 Drawing Sheets

(56) References Cited

U.S. PATENT DOCUMENTS

| | | | |
|---|---|---|---|
| 2007/0001822 A1* | 1/2007 | Haug | 340/384.1 |
| 2007/0177029 A1* | 8/2007 | Wada et al. | 348/222.1 |
| 2008/0056568 A1* | 3/2008 | Porikli et al. | 382/173 |
| 2008/0204208 A1* | 8/2008 | Kawamata et al. | 340/435 |
| 2009/0102943 A1* | 4/2009 | Hattori | 348/223.1 |
| 2009/0226033 A1* | 9/2009 | Sefcik | 382/103 |
| 2010/0092031 A1* | 4/2010 | Bergeron et al. | 382/103 |

FOREIGN PATENT DOCUMENTS

| | | |
|---|---|---|
| JP | 11-304582 A | 11/1999 |
| JP | 2001-99710 A | 4/2001 |
| JP | 2003-240869 A | 8/2003 |
| JP | 2005-115631 A | 4/2005 |
| JP | 2005-148224 A | 6/2005 |
| JP | 2005-318408 A | 11/2005 |
| JP | 2008-152709 A | 7/2008 |
| JP | 2009-253857 A | 10/2009 |
| JP | 2011185644 A | 9/2011 |
| JP | 2011220866 A | 11/2011 |
| JP | 2011220867 A | 11/2011 |

OTHER PUBLICATIONS

Office Action dated Apr. 3, 2014, issued by the State Intellectual Property Office of the P.R.C. In corresponding Chinese Application No. 201110053242.3.

* cited by examiner

ACTIVE VISIBILITY SUPPORT APPARATUS AND METHOD FOR VEHICLE

This application is based upon and claims the benefit of priority from Japanese patent application No. 2010-046429, filed on Mar. 3, 2010, the disclosure of which is incorporated herein in its entirety by reference.

BACKGROUND OF THE INVENTION

1. Field of the Invention

The present invention relates to an active visibility support apparatus and an active visibility support method for a vehicle which are used to allow a driver to more properly identify an object to be viewed while driving a vehicle.

2. Description of Related Arts

While driving a vehicle, a driver of the vehicle needs to visually identify objects such as other vehicles, persons on the road, marking lines on the road surface, roadside structures and drive the vehicle in accordance with the results of the identification of the objects. For example, during driving, upon spotting an elongate vertically-standing object ahead and slightly toward left in the direction of forward movement, the driver needs to determine whether the object is a utility pole or a pedestrian. If the object is a pedestrian or the like, the driver needs to take action, for example, to drive slowly. However, under adverse conditions such as rainy weather or nighttime, spotting, in the field of view, an object in front of the vehicle is difficult. Determining what the object is more difficult.

Thus, mounting of an active visibility support apparatus in a vehicle has been examined to facilitate the identification of an object expected to be present in the driver's field of view. The active visibility support apparatus illuminates the front of the vehicle with near infrared light or the like to acquire an image of a scene in the direction of forward movement as seen from the vehicle, thus allowing the driver to easily determine what each of the objects in the image is. Reflection spectrum is expected to vary with the type of the object. Thus, to allow an object to be identified, it has been proposed to acquire a plurality of images for different wavelength bands by using a multiband camera or the like to identify the object.

As described in JP2005-115631A, compared to normal color cameras that use filters corresponding to the three primary colors, that is, the three wavelength bands, the multiband camera offers wavelength bands that are individually narrow. The multiband camera further includes a large number of such wavelength bands to allow images to be acquired for the respective individual wavelength bands. A typical multiband camera includes several to several tens of wavelength bands. Because of the large number of wavelength bands, the use of the multiband camera allows the spectrum of light from each point on the object to be reproduced, though the accuracy of the spectral reproduction is low. JP2005-115631A discloses an image display apparatus which uses a multiband camera to acquire images on one of which a user specifies a range to allow the spectrum of the range to be displayed in a graph or which calculates and displays an image for a particular wavelength when the wavelength is specified.

JP2001-099710A illustrates a multiband camera with a single imaging device, for example, a CCD (charge-coupled device) sensor, which uses, for example, a liquid crystal tunable filter capable of controlling a transmissive wavelength band, to switch the transmissive wavelength in order to take images for a plurality of wavelength bands. JP2001-099710A also illustrates a technique to compensate for a deviation from a set value for the spectral transmission characteristics of the tunable filter and to estimate the spectrum of an object at a finer wavelength resolution from images for a plurality of wavelength bands.

JP11-096333A illustrates a technique to estimate the spectrum of an object at a finer wavelength resolution from images for a plurality of wavelength bands taken by a multiband camera, similarly to JP2001-099710A. JP11-096333A also discloses the use of a rotary filter for switching a band for imaging when a single imaging device is provided.

When an object is illuminated with light and an image of reflected light from the object is taken, images for a plurality of wavelength bands can be acquired by using, as an illumination light source, a plurality of light emitting diodes (LEDs) each with narrow-band emission spectral characteristics to take images of the object with the wavelength of the illumination light varied.

Furthermore, as an example of identification of an object in a large number of images for a large number of wavelength bands obtained by a multiband camera, a hyper spectral sensor with more wavelength bands, or the like, JP2008-152709A discloses a method of examining what covers the surface of the ground based on a large number of hyper spectral images. This method examines whether the target surface of the ground is, for example, a road or a water surface or is covered with plants, and if the surface of the ground is covered with plants, examines the distribution of vegetation. The method according to JP2008-152709A presets a combination of a plurality of wavelength bands suitable for classification of areas according to classes of roads, forests, and the like to allow an extraction target area to be automatically selected. For example, learning with supervised data is used to set the classes. Then, only images for a plurality of wavelength bands corresponding to classes to be extracted are preselected. The target area is then identified in the selected images.

SUMMARY OF THE INVENTION

A technique itself has been established which involves taking images for a plurality of wavelength bands using a multiband camera or the like and estimating the reflection spectrum or the like of an object. However, at present, no sufficient technique is available which enables the object to be accurately identified in any situations when images for a plurality of wavelength bands are provided. The technique illustrated in JP2008-152709A described above requires presetting of the classes indicating which combination of wavelength bands to be used depending on what type of object is to be detected. Thus, even the technique illustrated in JP2008-152709A is insufficient to effectively detect and identify the object when images are taken in a momentarily varying situation such as the one where a vehicle is traveling and when no information is available indicating what the object itself is like. Furthermore, this technique requires learning with supervised data to set the classes. Hence, relevant processing itself is complicated.

From a viewpoint of that an active visibility support is mounted in a vehicle to support the driver's driving and operation, it is necessary that the apparatus reliably detects an object on the road or the roadside and presents the presence of such an object to a driver in real time, first. In addition, provided that the apparatus can then determine what the object is, the result of the determination needs to be able to be presented to the driver in real time.

An objective of the present invention is to provide a visibility support apparatus having a simple configuration and which is suitably mounted in a vehicle, the apparatus allowing an object on the road or the roadside to be accurately detected and supporting a driver so that the driver can easily determine what the object is.

Another objective of the present invention is to provide a visibility support method which allows accurate on-board detection of an object on the road or the roadside and which supports a driver so that the driver can easily determine what the object is.

According to an exemplary aspect of the present invention, the visibility support apparatus includes: a light source unit configured to illuminate an object with light in one of a plurality of wavelength bands with different peak wavelengths while switching among the wavelength bands; a light receiving unit configured to receive reflected light from the object to generate a signal for an image for each of the plurality of wavelength bands; a wavelength selecting unit configured to compare signal intensities of pixels with each other in at least one image and set a set of those of pixels with comparable signal intensities which define the largest occupied area to be a reference area and to set the pixels not included in the reference area to be identification target pixels, and for each of the identification target pixels, compare a value of the pixel in the image for each wavelength band with a pixel value of the reference area to select at least two wavelength bands which are effective for detection of the object; and a display unit configured to group the identification target pixels based on a combination of a plurality of wavelength bands selected by the wavelength selecting unit for each identification target pixel and display an image in which the object is distinguishably shown based on the result of the grouping.

According to another exemplary aspect of the present invention, the visibility support method includes: illuminating an object with light in one of a plurality of wavelength bands with different peak wavelengths while switching among the wavelength bands; receiving reflected light from the object to generate a signal for an image for each of the plurality of wavelength bands; comparing signal intensities of pixels with each other in at least one image and setting a set of those of pixels with comparable signal intensities which define the largest occupied area to be a reference area; setting the pixels not included in the reference area to be identification target pixels, and for each of the identification target pixels, comparing a value of the pixel in the image for each wavelength band with a pixel value of the reference area to select at least two wavelength bands which are effective for detection of the object; grouping the identification target pixels based on a combination of a plurality of wavelength bands selected by the selection for each identification target pixel; and displaying an image in which the object is distinguishably shown based on the result of the grouping.

According to the above configurations, the object is extracted based on the reference area which is extracted in real time. Thus, even in a momentarily varying situation, the object can be reliably distinguished from another object in the image. Furthermore, detailed spectrum calculations need not be carried out while the object is distinguished from another object by using such a somewhat limited number of wavelength bands as can be provided by switching among a plurality of light sources to determine, for each identification target pixel, a combination of wavelength bands which represents the identification target pixel. Thus, required calculation processing can be simplified, and the scale of the apparatus can be reduced.

The above and other objects, features, and advantages of the present invention will become apparent from the following description based on the accompanying drawings which illustrate exemplary embodiments of the present invention.

DETAILED DESCRIPTION OF THE EXEMPLARY EMBODIMENTS

Figure 1:
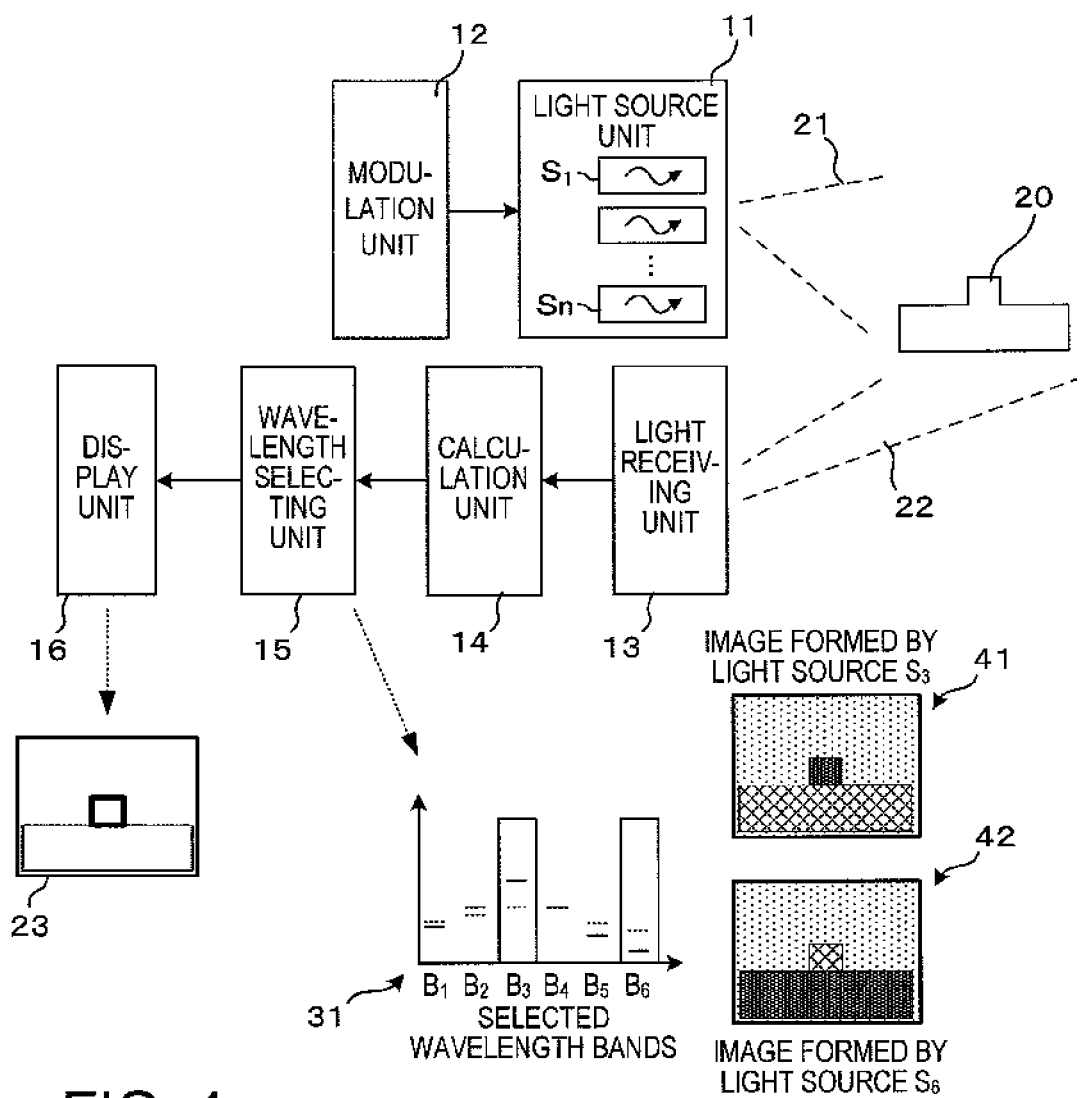
FIG. 1 is a block diagram showing the configuration of an active visibility support apparatus for a vehicle according to an exemplary embodiment of the present invention.

An apparatus according to an exemplary embodiment of the present invention shown in FIG. 1 is an active visibility support apparatus which is mounted in a vehicle to detect an object expected to be present in a driver's field of view and notify the driver of the presence of the object to support the driver so that the driver can identify the object. In order to allow at least two objects to be separately detected, the visibility support apparatus illuminates the object with at least two types of light in different wavelength bands, and selects at least two types of wavelength bands that are effective for identification, from reflection intensity signals obtained by reflection of light by the object. Then, based on the selected wavelength bands, two objects are displayed and distinguished from each other on an image.

The visibility support apparatus includes: light source unit 11 having at least two light sources $S_1$ to $S_n$ to illuminate measuring object 20, an object expected to be present in front of a vehicle, with light in different wavelength bands, for example, near-infrared rays; and modulation unit 12 configured to drive light source unit 11 to modulate the light intensity of illumination light 21 directed from light source unit 11 to the measuring object 20. The radiation or emission spectra of light sources $S_1$ to $S_n$ are known and have different peak wavelengths. Modulation unit 12 can individually modulate the radiation intensities of light sources $S_1$ to $S_n$. The term "modulation" as used herein includes not modulation involving only turn-on and -off of each of the light sources. Light radiated by light sources $S_1, S_2, \ldots, S_n$ is assumed to be in wavelength bands $B_1, B_2, \ldots, B_n$, respectively. Additionally, for convenience of description, wavelength bands $B_1, B_2, \ldots, B_n$ are assumed to increase in peak wavelength in this order.

Furthermore, in order to allow reflected light 22 from objects to be received and displayed such that at least two objects can be distinguished from each other on an image, the visibility support apparatus further includes: light receiving unit 13 formed of a CCD sensor and configured to receive reflected light 22 from the object to convert the light into an electric signal for an image based on the reflection intensity of the reflected light; calculation unit 14 configured to carry out image calculation processes such as subtractions and divisions on the signal obtained from light receiving unit 13; wavelength selecting unit 15 configured to compare reflection intensity signals output by calculation unit 14 as images for the respective wavelengths to select at least two wavelength bands that are effective for distinguishing objects from each other; and display unit 16 configured to distinguishably display at least two objects based on the set of wavelength bands selected by wavelength selecting unit 15. Calculation unit 14 may be configured to determine the difference image between an image obtained when an object is illuminated with light and an image obtained when the object is not illuminated with light, thus alleviating the adverse effects of extra background light components. Moreover, calculation unit 14 may be configured to correct reflection intensity signals based on the radiation intensity distribution of each of the light sources in light source unit 11 and the spectral sensitivity of a light receiving element in light receiving unit 13 to calculate more accurate reflectance.

Now, wavelength selecting unit 15 will be described.

In the configuration according to the present embodiment, plurality of light sources $S_1$ to $S_n$ with the different peak wavelengths are provided in light source unit 11. Modulation unit 12 allows one of the light sources to emit light while switching among the light sources. Measuring target 20 is then irradiated with illumination light 21 from the light source and light receiving unit 13 receives reflected light 22 from measuring target 20. As a result, a plurality of images in different wavelength bands are acquired. For example, given six light sources with different peak wavelengths, six images in different wavelength bands, that is, images corresponding to wavelength bands $B_1$ to $B_6$, are obtained. Each of the images is expected to show a plurality of objects present within the same field of view. Here, each of the images is assumed to contain objects A and B. Then, since the objects offer different reflection spectra, object A may be shown brighter than object B in one image and darker than object B in another image, and objects A and B may not be substantially distinguished from each other in yet another image. Such an example is shown in FIG. 1 as images 41 and 42. Image 41 is obtained from light of light source $S_3$. Image 42 is obtained from light of light source $S_6$. In supporting driving of a vehicle, it is not preferable to present a plurality of images or pictures to the driver, but it is preferable to clearly distinguishably display object A and object B in a single image or picture.

Thus, based on, for example, six images for different wavelength bands, wavelength selecting unit 15 selects at least two wavelength bands suitable for distinguishably displaying a plurality of objects, for example, objects A and B, for each pixel. The thus selected wavelength bands are used to allow display unit 16 to clearly distinguishably display the objects as described below. A selection method may be to select a set of a plurality of wavelength bands as involves inversion of the magnitude relation of the reflection intensity signal level between the objects or to select a set of a plurality of wavelength bands involving a difference of at least a given value in reflection intensity signal level between the objects.

Graph 31 shown in FIG. 1 illustrates selection of ones of wavelength bands $B_1$ to $B_6$. In this graph, the signal intensity of a signal from pixels corresponding to one object is shown by a dotted line for each wavelength band while the signal intensity of a signal from pixels corresponding to another object is shown by a solid line for each wavelength band.

Selection of a set of wavelength bands requires extraction, from an image, of an area that is a candidate for an object. Here, since the apparatus is mounted in a vehicle, it is assumed that a relatively large area of each image is occupied by a road surface portion paved with asphalt or concrete, though this may depend on the viewing angle of light receiving unit 13. Thus, wavelength selecting unit 15 first tries to detect a paved road surface portion as a reference area, and then uses the reference area as a reference for comparison to compare the signal intensities of pixels not belonging to the reference area. Based on the result of the comparison, wavelength selecting unit 15 selects a set of wavelength bands allowing the object to be distinguished from the reference area. The pixels not included in the reference area are hereinafter referred to as identification target pixels.

It is assumed that the set of wavelength bands to be selected includes two wavelength bands. With the reference area already set, a set of wavelength bands allowing the object to be distinguished from the reference area may be selected for the identification target pixels based on, for example, (i) to (iii):

(i) In a first case where the pixel value of each of the identification target pixels is equal to or greater than that of the reference area for all the wavelength bands, wavelength bands are selected which involve the greatest and smallest differences, respectively, resulting from subtraction of the pixel value of the reference area from the pixel value of the identification target pixel;

(ii) In a second case where the pixel value of the identification target pixel is equal to or smaller than that of the reference area for all the wavelength bands, wavelength bands are selected which involve the greatest and smallest differences, respectively, resulting from subtraction of the pixel value of the identification target pixel from the pixel value of the reference area;

(iii) In a third case where the pixel value of the identification target pixel is greater than that of the reference area in some wavelength bands, whereas the pixel value of the identification target pixel is smaller than that of the reference area in some wavelength bands, wavelength bands are selected which involve the greatest values of the identification target pixel in a positive direction and a negative direction, respectively, based on the pixel value of the reference area.

Figure 2:
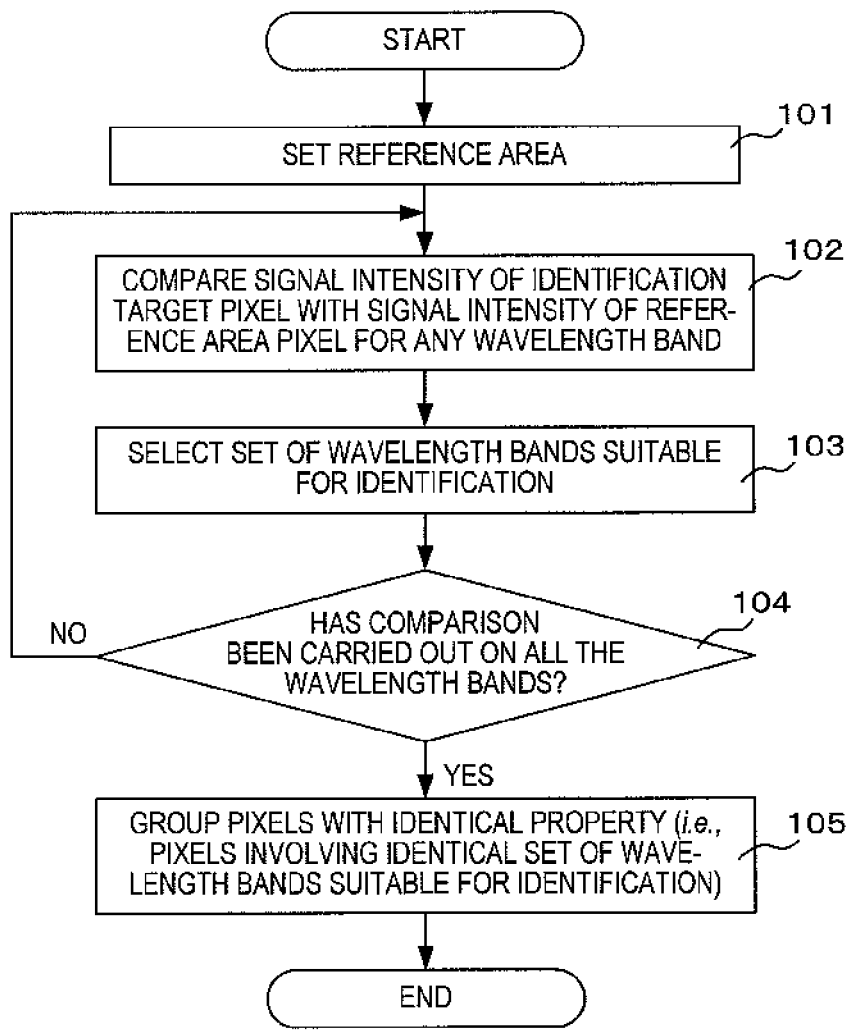
FIG. 2 is a flowchart showing processing executed by a wavelength selecting unit.
Figure 3:
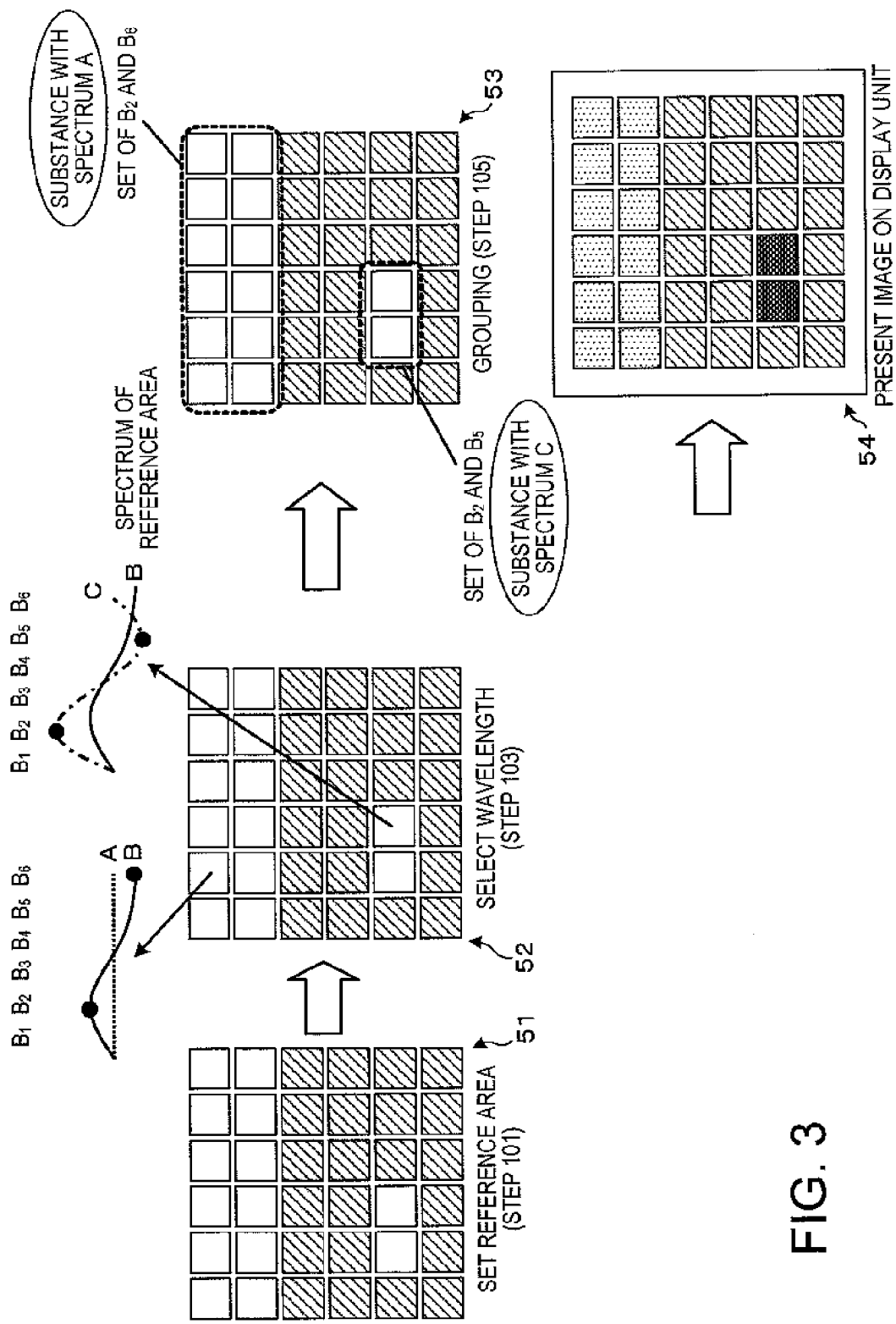
FIG. 3 is a diagram illustrating the processing executed by the wavelength selecting unit.

FIG. 2 is a flowchart illustrating an example of operation of wavelength selecting unit 15, and FIG. 3 is a diagram showing how an image is processed during the operation.

First, in step 101, in an image for any wavelength band, the signal intensities of pixels are compared with one another. Then, those of pixels with comparable signal intensities which define the largest occupied area are set to be the reference area. To allow the reference area to be accurately set, the above-described process may be repeatedly carried out on images for a plurality of wavelength bands. However, the process need not be carried out on all the wavelength bands. For example, in an image for wavelength band $B_1$, the signal intensities of pixels are compared with one another, and a set of those of pixels with comparable signal intensities which define the largest occupied area is set to the reference area. Then, this process is repeatedly carried out on images for wavelength bands $B_2$, $B_3$, ... in this order. As a result, finally, in image 51 in FIG. 3, hatched pixels are set to be the reference area.

Then, in step 102, in an image for any wavelength band, the signal intensity of the identification target pixels is compared with the signal intensity of the pixels in the reference area. Based on the result of the comparison, in step 103, a set of at least two wavelength bands suitable for identification is selected for each identification target pixel. In image 52 in FIG. 3, the identification target pixels are shown as white pixels. The pixels in the reference area correspond to the road surface and all offer similar reflection spectra. Thus, on the assumption that the pixels in the reference area offer the same reflection spectrum, solid line B in FIG. 3 indicates the signal intensity, that is, the reflection spectrum, of the reference area in each of wavelength bands $B_1$ to $B_6$. Furthermore, illustrated dotted line A indicates the spectrum of the second pixel from the left in the top row of the identification target pixels in image 52. Wavelength bands $B_2$ and $B_6$ are selected for this pixel because the magnitude relation of the reflection level is inverted between wavelength bands $B_2$ and $B_6$. Similarly, dashed line C indicates the spectrum of the third pixel from the left in the second row from the bottom in image 52. Wavelength bands $B_2$ and $B_5$ are selected for this pixel.

Then, in step 104, the apparatus determines whether or not the comparison between the identification target pixels and the reference area pixels has been carried out on all the wavelength bands. If the comparison has not been carried out on all the wavelength bands, the process returns to step 102 in order to carry out comparison on next wavelength band. If the comparison has been carried out on all the wavelength bands, the process shifts to step 105. In step 105, pixels involving the same set of wavelength bands suitable for identification are grouped. Then, the processing carried out by wavelength selecting unit 14 finishes. The pixels involving the same set of wavelength bands suitable for identification are hereinafter referred to as the pixels with the same property.

In the example illustrated herein, the grouping results in the selection of the set of wavelength bands $B_2$ and $B_6$ for all the pixels in the top row and the next row below the top row as shown in image 53 in FIG. 3. Thus, these pixels form one group. The selected pixels have the property of involving the set of wavelength bands $B_2$ and $B_6$. The pixels in this group offer such a spectrum as shown by dotted line A in image 52 in FIG. 3, and correspond to a substance with spectrum A. Similarly, the set of wavelength bands $B_2$ and $B_5$ is selected for the second and third pixels from the left in the second row from the bottom. Thus, these pixels form another group. The selected pixels have the property of involving the set of wavelength bands $B_2$ and $B_5$. The pixels in this group offer such a spectrum as shown by dashed line C in image 52 in FIG. 3, and correspond to a substance with spectrum C.

Display unit 16 displays output image 23. In output image 23, the pixels in the reference area are displayed so as to be distinguished from the other pixels, and the pixels with one property are displayed so as to be distinguished from the pixels with another property. That is, display unit 16 displays pixel groups on the screen of a head-up display or the like so as to allow a pixel group with the same property to be easily distinguished from another pixel group with another property. This enables the driver to be alerted to another vehicle or a pedestrian present ahead in the direction of forward movement. Image 54 in FIG. 3 shows a display example. In actuality, color display or the like may be provided. However, in image 54 in FIG. 3, for description, the pixels belonging to the reference area are shown by medium-level hatching. The pixels with the property corresponding to the set of wavelength bands $B_2$ and $B_6$, that is, the pixels offering spectrum A, are shown by softly-colored halftone dots. The pixels with the property corresponding to the set of wavelength bands $B_2$ and $B_5$, that is, the pixels offering spectrum C, are shown by darkly-colored hatching.

Upon viewing such output image 23, the driver can easily know the presence of a pedestrian, another vehicle, or an obstacle in front of the vehicle in the direction of forward movement. The driver can also estimate what object is present based on the shape of the object in output image 23.

Figure 4:
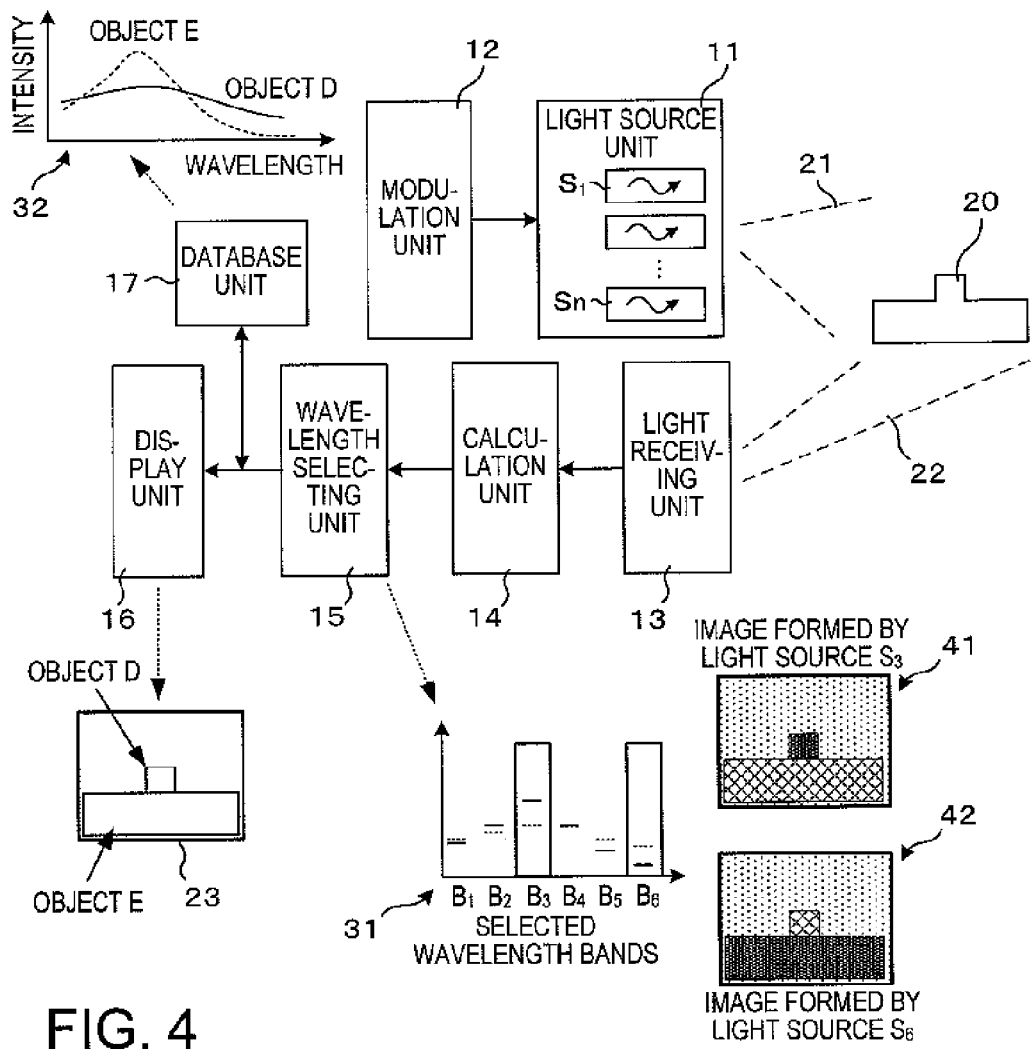
FIG. 4 is a block diagram showing the configuration of an active visibility support apparatus for a vehicle according to another exemplary embodiment of the present invention.

FIG. 4 shows an active visibility support apparatus according to another embodiment of the present invention. The visibility support apparatus shown in FIG. 4 is configured by adding database unit 17 to the visibility support apparatus shown in FIG. 1. A database configured to hold spectrum data on each type of object is stored in database unit 17. Graph 32 in FIG. 4 shows an example of data stored in database unit 17. Here, spectrum data on object D and spectrum data on object E are stored in database unit 17.

In this configuration, display unit 16 searches on each group of the pixels, the database based on the property of each pixel group to determine to what object the pixel group corresponds, for example, whether the pixel group corresponds to a utility pole or a pedestrian. Then, in output image 23 displayed so as to be presented to the driver, display unit 16 distinguishably shows objects and also shows characters or carries out highlighting to indicate what each object is like.

Thus, the driver can easily know the presence of, for example, a pedestrian, another vehicle, or an obstacle in front of the vehicle in the direction of forward movement, as well as the result of the identification indicating what the object in front of the vehicle is like.

It will be apparent that other variations and modifications may be made to the above described embodiments and functionality, with the attainment of some or all of their advantages. It is an object of the appended claims to cover all such variations and modifications as come within the true spirit and scope of the invention.

What is claimed is:

1. A visibility support apparatus comprising:
a light source unit configured to illuminate an object with light in one of a plurality of wavelength bands with different peak wavelengths while sequentially switching the wavelength band of the light among the plurality of wavelength bands;
a light receiving unit configured to receive reflected light from the object to generate a signal for an image for each of the plurality of wavelength bands thereby generating a series of images corresponding to the plurality of wavelength bands;
a wavelength selecting unit configured to compare signal intensities of pixels with each other in at least one image, set a set of those of pixels with comparable signal intensities which define the largest occupied area to be a reference area and set the pixels not included in the reference area to be identification target pixels, and for each of the identification target pixels, compare a value of the pixel in the image for each wavelength band with a pixel value of the reference area to select, among the plurality of wavelength bands, at least two wavelength bands which are effective for detection of the object at each of the identification target pixels; and
a display unit configured to classify the identification target pixels into groups based on a combination of a plurality of wavelength bands selected by the wavelength selecting unit for each identification target pixel such that identification target pixels corresponding to the same combination of the selected wavelength bands belong to the same group, and display an image in which the object is distinguishably shown based on the result of the classification such that identification target pixels of one group are distinguished from identification target pixels of another group.

2. The apparatus according to claim 1, further comprising a calculation unit configured to correct the signal for the image for each of the plurality of wavelength bands based on a signal obtained by the light receiving unit when the object is not illuminated with the light from the light source unit.

3. The apparatus according to claim 1, wherein the images for the plurality of wavelength bands are used to set the reference area.

4. The apparatus according to claim 1, wherein the wavelength selecting unit selects two wavelength bands in such a manner that in a first case where the pixel value of each of the identification target pixels is equal to or greater than the pixel value of the reference area for all the wavelength bands, the wavelength selecting unit selects wavelength bands involving the greatest and smallest differences, respectively, resulting from subtraction of the pixel value of the reference area from the pixel value of the identification target pixel, that in a second case where the pixel value of the identification target pixel is equal to or smaller than the pixel value of the reference area for all the wavelength bands, the wavelength selecting unit selects wavelength bands involving the greatest and smallest differences, respectively, resulting from subtraction of the pixel value of the identification target pixel from the pixel value of the reference area, and that in a third case different from the first and second cases, the wavelength selecting unit selects wavelength bands involving the greatest values of the identification target pixel in a positive direction and a negative direction, respectively, based on the pixel value of the reference area.

5. The apparatus according to claim 1, further comprising a database configured to hold spectrum data on each type of object,
wherein the display unit searches the database to identify the object and displays a result of the identification.

6. A visibility support method comprising:
illuminating an object with light in one of a plurality of wavelength bands with different peak wavelengths while sequentially switching the wavelength band of the light among the plurality of wavelength bands;
receiving reflected light from the object to generate a signal for an image for each of the plurality of wavelength bands thereby generating a series of images corresponding to the plurality of wavelength bands;
comparing signal intensities of pixels with each other in at least one image and setting a set of those of pixels with comparable signal intensities which define the largest occupied area to be a reference area;
setting the pixels not included in the reference area to be identification target pixels, and for each of the identification target pixels, comparing a value of the pixel in the image for each wavelength band with a pixel value of the reference area to select, among the plurality of wavelength bands, at least two wavelength bands which are effective for detection of the object at each of the identification target pixels;
classifying the identification target pixels into groups based on a combination of a plurality of wavelength bands selected by the selection for each identification target pixel such that identification target pixels corresponding to the same combination of the selected wavelength bands belong to the same group; and
displaying an image in which the object is distinguishably shown based on the result of the classification such that identification target pixels of one group are distinguished from identification target pixels of another group.

7. The method according to claim 6, further comprising correcting the signal for the image for each of the plurality of wavelength bands based on a signal obtained when the object is not illuminated with the light.

8. The method according to claim 6, wherein the images for the plurality of wavelength bands are used to set the reference area.

9. The method according to claim 6, wherein two wavelength bands are selected in such a manner that in a first case where the pixel value of each of the identification target pixels is equal to or greater than the pixel value of the reference area for all the wavelength bands, wavelength bands are selected which involve the greatest and smallest differences, respectively, resulting from subtraction of the pixel value of the reference area from the pixel value of the identification target pixel, that in a second case where the pixel value of the identification target pixel is equal to or smaller than the pixel value of the reference area for all the wavelength bands, wavelength bands are selected which involve the greatest and smallest differences, respectively, resulting from subtraction of the pixel value of the identification target pixel from the pixel value of the reference area, and that in a third case different from the first and second cases, wavelength bands are selected which involve the greatest values of the identification target pixel in a positive direction and a negative direction, respectively, based on the pixel value of the reference area.

10. The method according to claim 6, further comprising searching a database configured to hold spectrum data on each type of object to identify the object, and displaying a result of the identification.

* * * * *